(12) United States Patent
Nguyen et al.

(10) Patent No.: US 9,759,252 B2
(45) Date of Patent: Sep. 12, 2017

(54) HIGH SPEED COMPOSITE DRIVE SHAFT

(71) Applicant: Sikorsky Aircraft Corporation, Stratford, CT (US)

(72) Inventors: Dean Nguyen, Greenwich, CT (US); Geoffrey Clive Robert Davis, Madison, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 487 days.

(21) Appl. No.: 14/018,782

(22) Filed: Sep. 5, 2013

(65) Prior Publication Data

US 2015/0060594 A1 Mar. 5, 2015

(51) Int. Cl.

| | |
|---|---|
| *F16C 3/26* | (2006.01) |
| *F16C 3/02* | (2006.01) |
| *B29C 70/30* | (2006.01) |
| *B64C 27/14* | (2006.01) |
| *B29C 70/48* | (2006.01) |
| *B29L 31/00* | (2006.01) |
| *B29K 307/04* | (2006.01) |

(Continued)

(52) U.S. Cl.
CPC .............. *F16C 3/026* (2013.01); *B29C 70/30* (2013.01); *B29C 70/48* (2013.01); *B64C 27/14* (2013.01); *B29K 2101/10* (2013.01); *B29K 2307/04* (2013.01); *B29K 2309/08* (2013.01); *B29L 2031/75* (2013.01); *F16C 2326/06* (2013.01); *F16C 2326/43* (2013.01)

(58) Field of Classification Search
CPC F16C 33/026; F16C 2326/43; F16C 2326/06; B29C 70/48; B29C 70/30; B64C 27/14; B64C 27/32; B32B 1/08; B32B 2597/00; B32B 5/12; B32B 7/005; B29D 23/00–23/008; B29D 23/24; B29L 2023/00; B29L 2023/22–2023/245; D02G 3/38
USPC ......... 244/60; 464/181; 428/34.1, 34.4–34.7, 428/35.7, 36.1, 36.2, 36.9, 36.91, 36.92, 428/114, 293.7, 295.4–296.1, 298.1–299.4
See application file for complete search history.

(56) References Cited

U.S. PATENT DOCUMENTS

| | | | | |
|---|---|---|---|---|
| 2,594,693 | A | * 4/1952 | Smith | ..................... B04B 7/085 138/123 |
| 3,490,983 | A | * 1/1970 | Lee | ....................... B29C 53/582 138/144 |
| 4,039,006 | A | * 8/1977 | Inoue | ....................... B04B 5/08 138/129 |

(Continued)

*Primary Examiner* — Medhat Badawi
*Assistant Examiner* — Vicente Rodriguez
(74) *Attorney, Agent, or Firm* — Cantor Colburn LLP

(57) ABSTRACT

A shaft assembly includes one or more axially-arranged plies having a plurality of bundles of strands. Each strand is formed of a ultra-high modulus carbon fiber material. One or more strands of glass fiber are wrapped around each bundle of the plurality of bundles. A volume of resin injected into the one or more axially-arranged plies and the assembly is cured via a resin transfer molding process. A method of forming a shaft assembly includes arranging a plurality of strands of ultra-high modulus carbon fiber material into a plurality of bundles. Each bundle of the plurality of bundles is wrapped with one or more strands of glass fiber material. The plurality of bundles are arranged into one or more axially-extending plies at a mandrel. A volume of resin is injected into the plurality of bundles and is cured to form the shaft assembly.

9 Claims, 4 Drawing Sheets

(51) Int. Cl.
B29K 309/08 (2006.01)
B29K 101/10 (2006.01)

(56) References Cited

U.S. PATENT DOCUMENTS

| | | | | |
|---|---|---|---|---|
| 4,089,190 | A * | 5/1978 | Worgan | F16C 3/026 138/130 |
| 4,248,062 | A * | 2/1981 | McLain | B29C 70/085 138/130 |
| 4,589,801 | A * | 5/1986 | Salama | B63B 21/502 156/173 |
| 5,071,687 | A * | 12/1991 | Shigetoh | B29C 37/0082 156/191 |
| RE35,081 | E * | 11/1995 | Quigley | B29C 70/08 114/102.31 |
| 5,727,357 | A * | 3/1998 | Arumugasaamy | D07B 1/025 428/377 |
| 5,910,361 | A * | 6/1999 | Guevel | D02G 3/385 264/210.1 |
| 7,147,904 | B1 * | 12/2006 | Crawford | D02G 3/38 138/118 |
| 2001/0013669 | A1 * | 8/2001 | Cundiff | B29C 70/083 264/103 |
| 2006/0258469 | A1 * | 11/2006 | Dewhirst | F16C 3/026 464/181 |
| 2009/0053442 | A1 * | 2/2009 | Nguyen | D01F 6/04 428/36.3 |
| 2010/0113170 | A1 * | 5/2010 | Schreiber | F01D 5/282 464/181 |
| 2013/0255437 | A1 * | 10/2013 | Hull | F16F 15/315 74/572.11 |

\* cited by examiner

HIGH SPEED COMPOSITE DRIVE SHAFT

BACKGROUND

The subject matter disclosed herein relates to construction of rotating shafts. More specifically, the subject matter disclosed herein relates to high speed rotating shafts for, for example, engine power transfer.

Drive systems, such as those in rotor craft utilizing turbofan engines to drive the rotor craft rotors, utilize rotating drive shafts for power transfer. Combustion drives the turbofan turbine, which in turn drives rotation of the drive shaft, connected to the turbine. The drive shaft is connected to and drives a rotor assembly of the rotorcraft, in some instances, via a gearbox. Such shafts are typically formed from steel or other metallic materials, capable of rotation of about 7000-8000 rpm.

In some rotorcraft, however, it is required that the drive shaft rotate at high speed, up to about 10,000 rpm, due to rotational speeds of the turbofan engine used to increase operational efficiency of the turbofan engine. As such, a conventional steel shaft is not usable in such rotorcraft, as the steel shaft of required size and weight could not also meet the torque and bending stiffness requirements at such high rotational speeds, resulting in failure of the steel drive shaft, and or other components of the drive system and/or the rotor craft.

BRIEF SUMMARY

In one embodiment, a shaft assembly includes one or more axially-arranged plies having a plurality of bundles of strands. Each strand is formed of a ultra-high modulus carbon fiber material. One or more strands of glass fiber are wrapped around each bundle of the plurality of bundles. A volume of resin injected into the one or more axially-arranged plies and the one or more axially arranged plies and the volume of resin are cured via a resin transfer molding process.

In another embodiment, a method of forming a shaft assembly includes arranging a plurality of strands of ultra-high modulus carbon fiber material into a plurality of bundles. Each bundle of the plurality of bundles is wrapped with one or more strands of glass fiber material. The plurality of bundles are arranged into one or more axially-extending plies at a mandrel. A volume of resin is injected into the plurality of bundles and the volume of resin is cured to form the shaft assembly.

In yet another embodiment, a rotary-winged aircraft includes an airframe and an engine located at the airframe. The engine is operably connected to and driving a rotor assembly via a drive shaft including one or more axially-arranged plies. Each axially-arranged ply includes a plurality of bundles of strands and each strand is formed of a ultra-high modulus carbon fiber material. One or more strands of glass fiber are wrapped around each bundle of the plurality of bundles. A volume of resin is injected into the one or more axially-arranged plies, and the one or more axially arranged plies and the volume of resin are cured via a resin transfer molding process.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
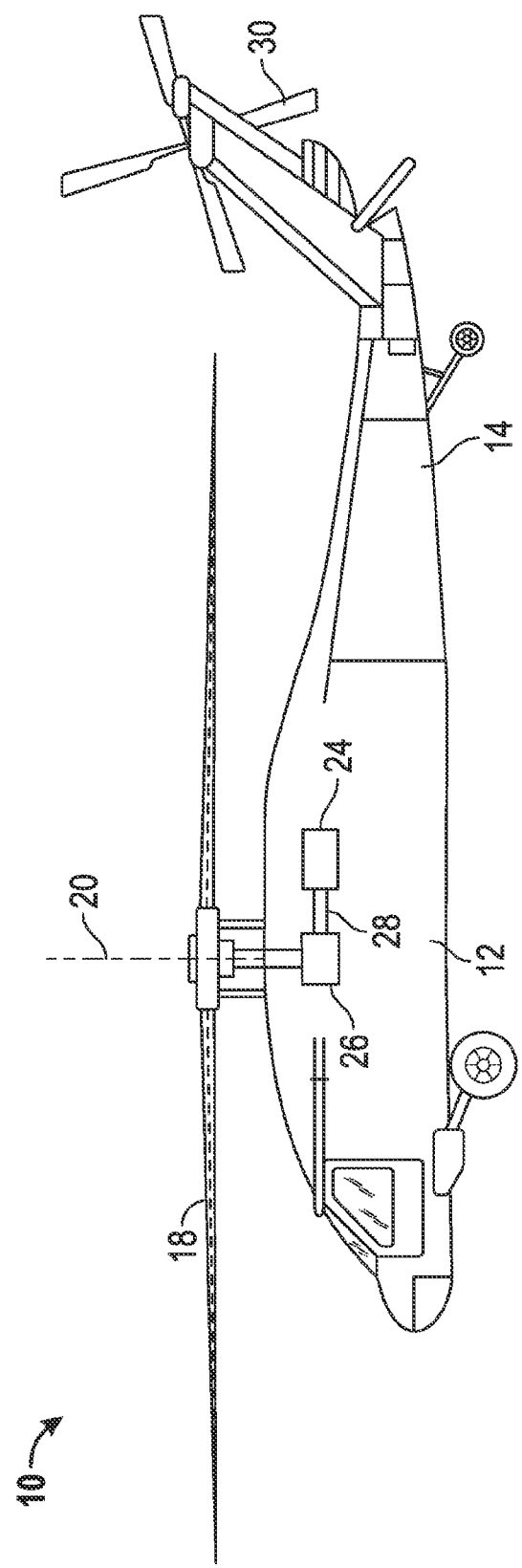
FIG. 1 is a schematic view of an embodiment of a helicopter.

The detailed description explains embodiments of the invention, together with advantages and features, by way of example with reference to the drawing.

DETAILED DESCRIPTION

Shown in FIG. 1 is schematic view of an embodiment of a rotary wing aircraft, in this embodiment a helicopter 10. The helicopter 10 includes an airframe 12 with an extending tail 14. A main rotor assembly 18 is located at the airframe 12 and rotates about a main rotor axis 20. The main rotor assembly 18 is driven by a power source, for example, an engine 24, in some embodiments, a turbofan engine, via a gearbox 26. The engine 24 is connected to the gearbox 26 via a drive shaft 28.

It is to be appreciated that while the drive shaft 28 disclosed herein is utilized to drive the main rotor assembly 18, the drive shaft 28 may be utilized to drive a tail rotor assembly 30 located at the extending tail 14. Further, the drive shaft 28 may be utilized in other applications such as shafts utilized in automobiles, ships or boats or the like where torque is being transmitted, and not restricted to rotary wing aircraft.

Figure 2:
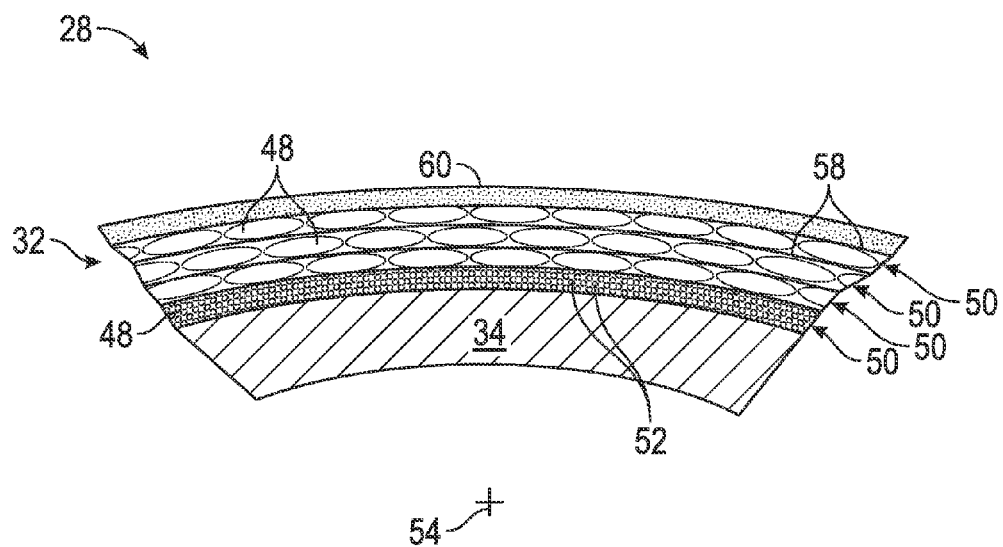
FIG. 2 is a schematic cross-sectional view of a preform.
Figure 3:
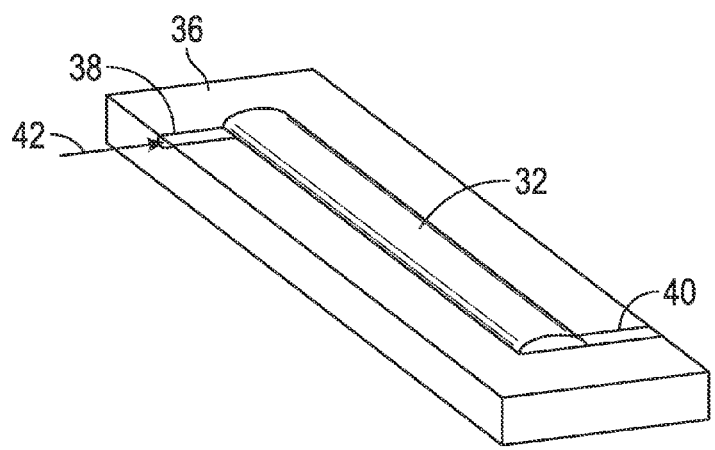
FIG. 3 is a schematic view of a preform and resin transfer molding arrangement.

Referring now to FIG. 2, the drive shaft 28 is formed from as a tubular element using composite materials via a resin transfer molding (RTM) process. The composite materials are formed into a preform assembly 32 around a mandrel 34. As shown in FIG. 3, once formed around the mandrel 34, the preform 32 is loaded into an RTM tool 36 having a resin inlet port 38 and resin outlet port 40. Resin 42 is injected into the preform assembly 32 via the resin inlet port 38, and the preform is subsequently cured to form the drive shaft 28. The resin 42 is, in some embodiments, a bismaleimide (BMI) resin.

Figure 4:
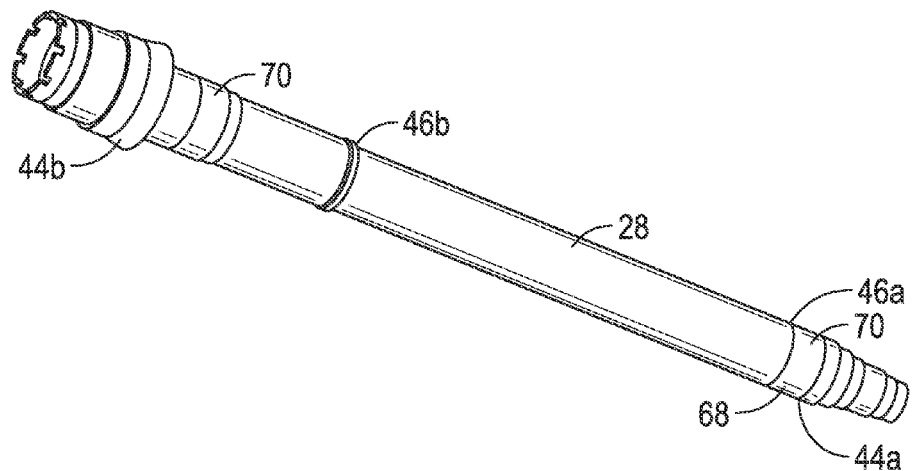
FIG. 4 is a schematic view of a shaft with bonded end fittings.

Referring to FIG. 4, once the drive shaft 28 is formed, end fittings 44 are secured to one or both shaft ends 46 including splines threads or the like to allow the drive shaft 28 to be secured to mating parts, for example the engine 24 and/or the gearbox 26. In some embodiments, the end fittings 44 are metallic components, and are secured to the drive shaft 28 by bonding.

Figure 5:
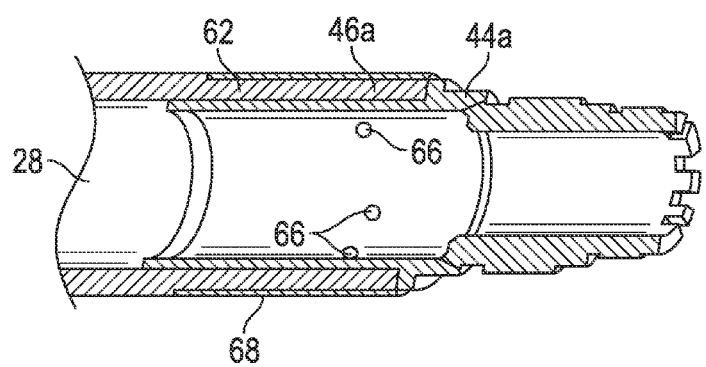
FIG. 5 is a cross-sectional view of an embodiment of an end fitting bonded to the shaft.

Referring to FIG. 5, in some embodiments, a first end fitting 44a is bonded to an inner diameter 62 of the drive shaft 28 at a first shaft end 46a. A plurality of rivets 66 are also used to secure the first end fitting 44a at the first shaft end 46a. To install the rivets 66, a first sleeve 68 is installed over the outer diameter 64, and the rivets 66 are installed through the first sleeve 68 the drive shaft 28 and the first end fitting 44a. To contain the rivets 66 should they become loose, a layer of overwrap material 70 (shown in FIG. 4), for example, fiberglass, is installed over the first sleeve 68 to cover the rivets 66. Balancing of the shaft 28 at high speed, in some embodiments up to 10,000 RPM, is achieved by removing material at an inboard end of the first end fitting 44*a*.

Figure 6:
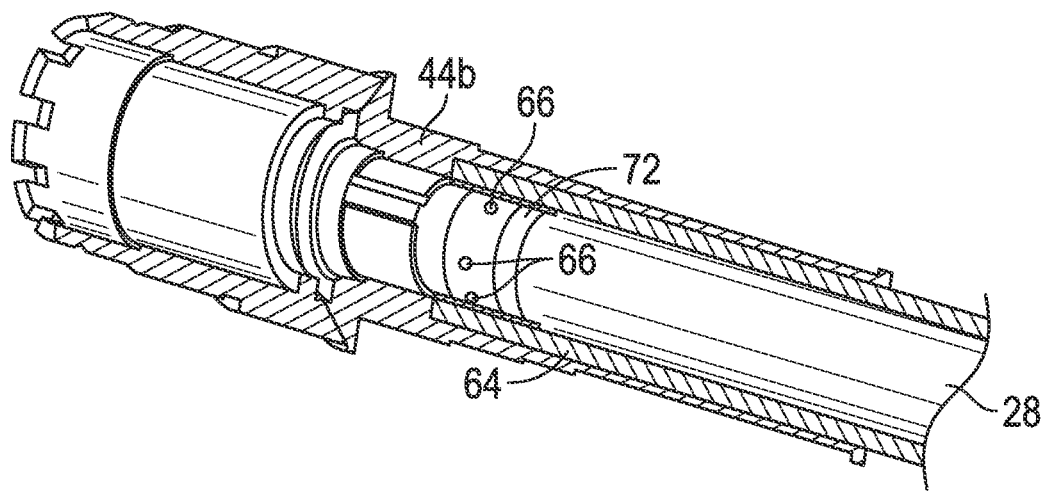
FIG. 6 is a cross-sectional view of another embodiment of an end fitting bonded to the shaft.

Referring now to FIG. 6, a second end fitting 44*b* is bonded to an outer diameter 64 of the drive shaft 28 at a second shaft end 46*b*.a second sleeve 72 is installed in the second shaft end 46*b* at the inner diameter 62. After the second end fitting 44*b* is bonded to the outer diameter 64 at the second shaft end 46*b*, rivets 66 are then installed through the second end fitting 44*b*, the second shaft end 46*b* and the second sleeve 72. Finally a layer of overwrap material 70 (shown in FIG. 4) is installed over the second end fitting 46*b* covering the rivets 66 to contain the rivets 66. Balancing of the drive shaft 28 is achieved by removing material at an outboard end of end fitting 44*b*.

Figure 7:
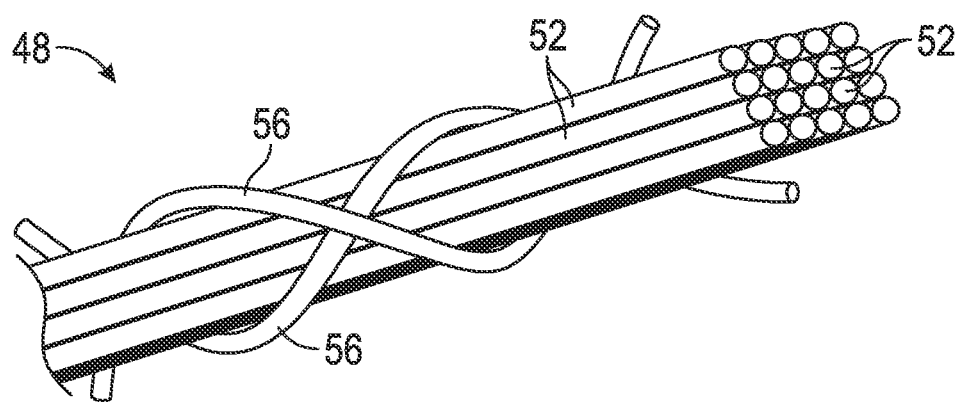
FIG. 7 is a schematic view of a strand bundle for an embodiment of a preform.

Referring now to FIG. 2, the construction of the preform 32 will be discussed in greater detail. The preform 32 includes a plurality of bundles 48 arranged in layers, or plies 50. As shown in FIG. 7, each bundle 48 includes a plurality of carbon fiber strands 52 of an ultra-high modulus (UHM) carbon fiber material. UHM carbon fiber materials are those having a tensile modulus of 70 to 140 million psi (Mpsi). An example of such a material is M60J, having a tensile modulus of 85 Mpsi. While the number of carbon fiber strands 52 in each bundle 48 may vary, in some embodiments, each bundle 48 has 18 carbon fiber strands 52. The carbon fiber strands 52 in the bundle 48 extend in a substantially axial direction, along a mandrel axis 54 (shown in FIG. 2). One or more wrap strands 56 of, for example, glass fiber, are wrapped around the bundle 48 to retain the carbon fiber strands 52 in the bundle 48 prior to curing. In some embodiments, the wrap strands 56 are oriented at a wrap angle of +/−45 degrees relative to the mandrel axis 54.

Referring again to FIG. 2, the bundles 48 are arranged in a layer, or ply 50, with the bundles 48 extending substantially axially along the mandrel axis 54. In some embodiments, adjacent plies 50 are separated by a layer of a relatively lower modulus bias ply material 58, a carbon fiber material such as IM7, having a modulus of about 40 Mpsi. In some embodiments, the bias ply material 58 is oriented at +/−45 degrees relative to the mandrel axis 54.

In the embodiment of FIG. 2, 4 plies 50 of bundles 48 are utilized, as well as 4 layers of bias ply material 58. Additionally, a cover layer 60 of glass fiber material is placed over the outermost layer of bias ply material 58. In some embodiments, the cover layer 60 is oriented at +/−35 degrees relative to the mandrel axis. It is to be appreciated that the number of layers/plies in the preform 32 construction of FIG. 2 is merely exemplary and preforms 32 having other numbers of plies are contemplated within the present disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A shaft assembly having a shaft axis and comprising:
one or more axially-arranged plies arranged along the shaft axis including:
a plurality of bundles arranged adjacent to each other in each of the one or more axially-arranged plies, the plurality of bundles extending in an axial direction of the shaft axis and in parallel with the shaft axis, each bundle of the plurality of bundles including:
a plurality of carbon fiber strands arranged at least substantially parallel to each other and in the axial direction of the shaft axis, the plurality of carbon fiber strands formed of an ultra-high modulus carbon fiber material having a tensile modulus of at least 70 Mpsi; and
one or more wrap strands of glass fiber wrapped around the plurality of carbon fiber strands of each bundle of the plurality of bundles; and
a volume of resin injected into the one or more axially-arranged plies;
wherein the one or more axially-arranged plies are arranged in a tubular shape about the shaft axis,
further comprising one or more end fittings secured to one or more axial ends of the shaft assembly, the end fitting being connectible to a drive train.

2. The shaft assembly of claim 1, wherein the one or more axially-arranged plies include a plurality of radially arranged plies that are radially arranged with respect to each other, and further comprising one or more bias plies of carbon fiber material disposed between adjacent radially arranged plies, and the one or more bias plies of carbon fiber material extending in the axial direction.

3. The shaft assembly of claim 2, wherein a bias modulus of the one or more bias plies is lower than the tensile modulus of the ultra-high modulus carbon fiber material.

4. The shaft assembly of claim 3, wherein the tensile modulus is about 85 Mpsi.

5. The shaft assembly of claim 1, wherein the tensile modulus of the ultra-high modulus carbon fiber material is about 85 Mpsi.

6. The shaft assembly of claim 1, wherein the volume of resin is a bismaleimide resin.

7. The shaft assembly of claim 1, wherein the one or more wrap strands of glass fiber are oriented at +/−45 degrees relative to the shaft axis.

8. A rotary-winged aircraft comprising:
an airframe;
an engine disposed at the airframe, the engine operably connected to and driving a rotor assembly; and
a drive shaft having a shaft axis and connecting the engine to the rotor assembly, the drive shaft including:
one or more axially-arranged plies including:
a plurality of bundles arranged adjacent to each other in each of the one or more axially-arranged plies, the plurality of bundles extending in an axial direction of the shaft axis and in parallel with the shaft axis, each bundle of the plurality of bundles including:
a plurality of carbon fiber strands arranged at least substantially parallel to each other and in the axial direction of the shaft axis, the plurality of carbon fiber strands formed of a ultra-high modulus carbon fiber material having a tensile modulus of at least 70 Mpsi; and
one or more wrap strands of glass fiber wrapped around the plurality of carbon fiber strands of each bundle of the plurality of bundles; and a volume resin injected into the one or more axially-arranged plies;

wherein the one or more axially arranged plies and the volume of resin are cured via a resin transfer molding process, further comprising one or more end fittings secured to one or more axial ends of the drive shaft.

9. The aircraft of claim 8, wherein the one or more axially-arranged plies include a plurality of radially arranged plies that are radially arranged with respect to each other, and further comprising one or more bias plies of carbon fiber material disposed between adjacent radially arranged plies, and the one or more bias plies of carbon fiber material extending in the axial direction.

* * * * *